United States Patent [19]

Buysch et al.

[11] 4,105,641

[45] Aug. 8, 1978

[54] PROCESS FOR THE PREPARATION OF ALIPHATIC POLYCARBONATES AND POLYURETHANES THEREFROM

[75] Inventors: Hans-Josef Buysch; Heinrich Krimm; Hans Rudolph, all of Krefeld, Fed. Rep. of Germany

[73] Assignee: Bayer Aktiengesellschaft, Leverkusen, Fed. Rep. of Germany

[21] Appl. No.: 778,659

[22] Filed: Mar. 17, 1977

Related U.S. Application Data

[63] Continuation-in-part of Ser. No. 687,565, May 18, 1976, abandoned.

[30] Foreign Application Priority Data

May 27, 1975 [DE] Fed. Rep. of Germany ....... 2523352

[51] Int. Cl.$^2$ ...................... C08G 18/44; C08G 18/08
[52] U.S. Cl. .................................. 526/712; 528/370; 528/371; 528/85
[58] Field of Search ........ 260/77.5 D, 75 M, 77.5 AP

[56] References Cited

U.S. PATENT DOCUMENTS

| | | | |
|---|---|---|---|
| 3,023,183 | 2/1962 | Nelson | 260/75 M |
| 3,133,113 | 5/1964 | Malkemus | 260/463 |
| 3,325,428 | 6/1967 | Graver et al. | 260/75 M |
| 3,639,354 | 2/1972 | Mueller et al. | 260/77.5 AP |

OTHER PUBLICATIONS

International Critical Tables of Numerical Data, Physics, Chemistry-Technology, vol. 3, pp. 318-324(1928).
Houben-Weyl, Methods of Organic Chemistry, 4th Ed., vol. I/2, p. 879.
Handbook of Chemistry & Physics, 53rd Edition, Chemical Rubber Co., Cleveland (1972-1973), pp. D-10,-14,-24,-25.
Beilstein vol. I, Supp. vol. 3, pp. 2057-2059.
DOS 1495299, Chemische Werke Huls (Springmann et al., Jan. 2, 1969.

*Primary Examiner*—H.S. Cockeram
*Attorney, Agent, or Firm*—Gene Harsh; Lawrence S. Pope; Frederick H. Colen

[57] ABSTRACT

The present invention relates to a process for the preparation of polycarbonates which contain aliphatically bound hydroxyl groups by transesterification of aliphatic dihydroxy compounds with glycol carbonate, optionally in the presence of transesterification catalysts, with simultaneous separation of the glycol by fractional distillation, which process is characterized in that ethylene glycol is removed from the reaction mixture as an azeotropic mixture by means of inert solvents with which ethylene glycol is substantially immiscible. The present invention further relates to the preparation of polyurethanes from these polycarbonates.

14 Claims, No Drawings

PROCESS FOR THE PREPARATION OF ALIPHATIC POLYCARBONATES AND POLYURETHANES THEREFROM

CROSS REFERENCE TO RELATED APPLICATION

This is a continuation-in-part of our co-pending application Ser. No. 687,565, filed May 18, 1976, and now abandoned.

BACKGROUND OF THE INVENTION

This invention relates to an improved process for the preparation of aliphatic polycarbonates by transesterification of dihydric alcohols with glycol carbonate.

It is known to prepare polycarbonates from aliphatic dihydroxyl compounds either by a process of phosgenation in which hydrogen chloride is liberated or bound by bases, such as pyridine or quinoline, or by a process of transesterification with carbonic acid esters of alcohols or phenols, preferably diphenylcarbonate, optionally with the aid of transesterification catalysts.

In either case, it is essential to use phosgene or a mixture of carbon monoxide and chlorine as source of carbonic acid. Technical processes which involve the preparation and handling of phosgene are different and costly on account of the of considerable safety risks involved and the high cost of materials due to corrosion. To this are added ecological problems since either the spent air is contaminated with hydrogen chloride or the effluent water with sodium chloride.

The process according to the present invention, on the other hand, is ecologically harmless since the source of carbonic acid used is the carbon dioxide from the atmosphere, which may easily be converted to glycol carbonate by reaction with ethylene oxide by known methods.

Although a process for the preparation of linear polycarbonates which is based on the reaction of selected aliphatic dihydroxyl compounds with glycol carbonates in the presence of basic transesterification catalysts followed by separation of the resulting glycols in a fractionating column has already been described in German Offenlegungsschrift No. 1,495,299 this process has various disadvantages which considerably restrict its technical usefulness. It is obviously only suitable for the production of cycloaliphatic polycarbonates based on relatively non-volatile dihydroxyl compounds, such as cyclohexane dimethanol and perhydrobisphenol. Even in that case, it is necessary to use a considerable excess of glycol carbonate because ethylene glycol cannot be completely separated even if a long fractionating column is used. Additional complicated operations are therefore required for recovering and purifying the excess ethylene glycol which is carried along.

According to German Offenlegungsschrift No. 1,495,299, the preparation of pure aliphatic polycarbonates (e.g. those based on hexane-1,6-diol) which are much more valuable in the field of polyurethanes, which is the application in which aliphatic polycarbonates are preferably used, gives rise to considerable difficulties. The yields are in these cases unsatisfactory and the molecular weights of the resulting products obtained are either too low or the OH numbers are too high for optimum effects to be obtained when the products are processed to polyurethanes.

There was therefore a technical demand for the development of a transesterification process by which aliphatic polycarbonates which would be optimally useful in the polyurethane field could be obtained and which would also be economical and uncomplicated in operation.

SUMMARY OF THE INVENTION

According to the present invention, this problem is solved by carrying out the process of transesterification of the aliphatic dihydroxyl compounds in the presence of inert solvents which are selected so that they function as carriers or formers of azeotropic mixtures for the ethylene glycol which is required to be split off, but not for the glycol carbonate or for the aliphatic dihydroxy compounds which are to be reacted, so that selective azeotropic separation of pure ethylene glycol may be achieved.

The present invention therefore relates to a process for the preparation of polycarbonates which contain aliphatically bound hydroxyl groups by transesterification of aliphatic dihydroxy compounds with glycol carbonate, optionally in the presence of transesterification catalysts, with simultaneous separation of the glycol by fractional distillation, which process is characterized in that ethylene glycol is removed from the reaction mixture by means of inert solvents with which ethylene glycol is substantially immiscible. This invention further relates to the preparation of polyurethanes from these polycarbonates.

DETAILED DESCRIPTION OF THE INVENTION

Aliphatic dihydroxyl compounds which are suitable for the process according to the present invention include, for example, butane-1,4-diol, 2,2-dimethylpropane-1,3-diol, hexane-1,6-diol, diethyleneglycol, triethylene glycol, tetraethylene glycol, octaethylene glycol, dipropylene glycol, N-methyldiethanolamine, cyclohexane-1,3-diol, cyclohexane-1,4-diol, 1,4-dimethylolcyclohexane, p-xylylene glycol, 2,2-bis-(4-hydroxycyclohexyl)-propane and the ethoxylation or propoxylation products of dihydric alcohols or phenols, such as bis-oxethyl-bisphenol A, bis-oxethyl-tetrachlorobisphenol A or bis-oxethyl-tetrachlorohydroquinone.

The transesterification process of the present invention may be carried out in the absence or the presence of transesterification catalysts. The advantage of conducting the process in the absence of transesterification catalysts is that the aliphatic polycarbonates which contain terminal hydroxyl groups according to the invention contain no compound which might affect their subsequent reaction with polyisocyanates.

The following are examples of conventional transesterification catalysts which may be used according to the present invention: lithium hydride, lithium hydroxide, lithium aluminum hydride, lithium borohydride, sodium methylate, sodium hydroxide, sodium acetate, potassium carbonate, zinc dust, zinc oxide, zinc acetate, lead naphthenate, manganese acetate, mercury oxide, antimony trioxide, boron trioxide, tin powder, tin granules, tin dilaurate, dibutyl tin dilaurate, tetrabutyl titanate, zirconium naphthenate, tetrabutyl zirconate, lanthanum hydroxide and cobalt acetyl acetonate; also tertiary amine, such as dimethylstearylamine, diazabicyclooctane, triethanolamine and N-methyldicyclohexylamine.

In view of the many factors which would influence the process, such as the nature of the glycol used, the nature and efficiency of the carrier, of the catalyst if one is used and of the fractionating column, the quantitative proportions of the reactants, the azeotropic compositions and the temperature and pressure, it was by no means foreseeable that the process according to the present invention would be able to fulfill such varied requirements as the possibility of achieving substantially quantitative conversion, purity of the ethylene glycol split off in the reaction and hence elimination of the subsequent purification processes, elimination of side reactions and ability to control the molecular weights, even relatively high molecular weights. This is all the more remarkable in view of the fact that the system taking part in the process according to the present invention comprises at least five substances, namely, the glycol put into the process, the glycol carbonate, the carrier, the glycol which is required to be split off and the end product itself, and all these components influence each other in a manner which is not foreseeable. However, the process according to the present invention will function satisfactorily only if the azeotropic boiling mixture obtained consists substantially of carrier and ethylene glycol.

It must be regarded as surprising that the selective separation of one component from such a complicated system would be possible at all.

This explains why only a few selected solvents have proved to be suitable for the process according to the present invention.

Thus, among the substances known to form azeotropic mixtures with ethylene glycol, for example, those given in Beilstein Volume 1, Supplementary Volume 3, page 2057, only a small proportion are suitable for the process according to the present invention. There are various reasons for this. First, the boiling temperatures of the azeotropic mixtures must lie within the range of reaction temperatures and below the boiling point of the glycol carbonate and of the glycol which is to be reacted. Furthermore, the polarity, that is to say the dissolving power of the carrier, obviously also plays an important role. Completely non-polar, i.e. poor solvents, are just as unsuitable as too highly polar solvents which may no longer ensure substantially quantitative separation of ethylene glycol. Secondly, a sufficiently high difference in density between ethylene glycol and the carrier is an important condition since satisfactory operation of the process is possible only if phase separation in the separator proceeds sufficiently rapidly.

The following are examples of suitable inert solvents which may be used according to the present invention as azeotropic forming substances for ethylene glycol, if desired in the form of mixtures: aromatic hydrocarbons, such as toluene, xylene, ethylbenzene, cumene, 1,2,4-trimethylbenzene, mesitylene, tetramethylbenzene, cymene, diethylbenzene diisopropylbenzene, chlorotoluene, bromobenzene or tetralin; olefins, such as propenyl benzene, allyl benzene or α-methylstyrene; ethers, such as dibutyl ether, diisobutyl ether, diamyl ether, anisole, phenetole or cresol methyl ether; and ketones, such as dibutylketone, di-tert.-butyl ketone or diamyl ketone.

Carriers which are unsuitable for the process according to the present invention or provide no advantage over the prior art are, for example, decane, dodecane, tridecane, dimethyl octane, mineral spirits, chlorobenzene, dichlorobenzene, trichloropropane, tetrachloroethane, ethylcyclohexane, isopropylcyclohexane, decalin, styrene, and indene.

If any of the solvents mentioned above are known as distinct isomers, they may be used in this form or in the form of isomer mixtures.

The proportions in which the starting materials, dihydroxyl compound and glycol carbonate, are used is not of great importance. It is one of the advantages of the process according to the present invention that it is not necessary to use a substantial excess of glycol carbonate. Although it is in many cases sufficient to use an equimolar ratio of reactants, a slight excess of glycol carbonate is advisable for safety's sake, that is to say in order to obtain as far as possible quantitative yields and sufficiently high molecular weights within acceptable lengths of time. An excess of from 10 to 30 mol percent is sufficient for this purpose.

The choice of carrier will depend on the desired reaction temperature and on the activity of the catalyst if one is used. The higher the boiling point of the solvent, the higher is the proportion of ethylene glycol in the azeotropic mixture, but the boiling point or reaction temperature should not be sufficiently high to initiate unwanted side reactions, such as liberation of $CO_2$. The general rule applies that the higher the activity of the catalyst, the lower may be the boiling point of the carrier used. On the other hand, the less a catalyst tends to promote side reactions, the higher may be the reaction temperatures employed. Thus, low-boiling azeotropic-forming compounds, such as toluene or xylene, may be used to advantage with highly active transesterification catalysts, such as lithium hydroxide, sodium methylate or sodium acetate. The quantity of carrier used (based on the mixture of dihydroxyl compound and glycol carbonate) is generally from 5 to 200%, by weight, and preferably from 10 to 100%, by weight.

The quantity of catalyst optionally used is generally from about 0.0001 to 0,5%, by weight, based on the weight of the reaction mixture (mixture of dihydroxyl compound and glycol carbonate), preferably $10^{-7}$ to $10^{-2}$ moles of catalyst per 1 mol of diol. When using insoluble catalysts, such as tin powder, which may subsequently quite easily be completely removed by filtration, substantially larger quantities of catalyst, up to about 20%, by weight, based on the reaction mixture, are in some cases advantageous. Furthermore, exceptionally light-colored and in many cases colorless reaction products are obtained under the influence of tin powder.

The reaction temperatures are suitably in the range of from about 100° to 200° C, preferably from 130° to 190° C.

The process according to the present invention is generally carried out under normal pressure, but in cases where it is important to complete the transesterification reaction within a relatively short time it is advantageous to employ a slightly reduced pressure. In that case, a relatively high boiling carrier, such as diisopropylbenzene or tetralin, is used and the pressure is reduced so that the boiling point is in the region of the temperature at which the desired reaction velocity is obtained. Owing to the fact that the boiling point of ethylene glycol is then lowered at the same time, the glycol may be separated rapidly and without unwanted side reactions at a lower temperature level.

The molecular weights of the end products of the process may be influenced within wide limits. The products may be adjusted to comparatively low molecular weights by controlling the quantity of ethylene glycol split off. Higher molecular weights are obtained if, after removal of the carrier and, where indicated, also unreacted glycol carbonate, a definite quantity of the dihydroxyl compound put into the process still remains to be distilled off under conditions of transesterification. Comparatively non-volatile dihydroxyl compounds may be converted into high molecular weight polycarbonates if, after removal of the major quantity of ethylene glycol in accordance with the process according to the present invention, the carrier is circulated over a column with a substance, such as calcium chloride, which absorbs the glycol or over a molecular sieve.

The molar weights of the dihydroxypolycarbonates are generally from 500 to 20,000 and preferably from 500 to 5000.

The products of the process may be used for a wide variety of technical purposes, for example, as plasticizers and lubricants, but they are particularly valuable as starting materials for the production of polyurethanes, in which they serve as linear condensates with hydroxyl end groups. When used for this purpose, they have a particularly great importance because they differ from the products obtained by previously known processes in being completely free from interfering end groups, such as phenylcarbonic acid ester, chlorocarbonic acid ester or chloralkyl groups. The new products of the process are therefore strictly bifunctional in relation to the OH groups, a feature which is of great importance for achieving high molecular weights in the secondary products produced from them.

Polyurethanes may be produced from the dihydroxypolycarbonates according to the present invention by reacting them with polyisocyanates in conventional manner, optionally together with other polyhydroxyl compounds of the type known for the production of both cellular and homogeneous polyurethanes and optionally together with low molecular weight chain lengthening agents. If desired, known catalysts, blowing agents, fillers, additives and flame retarding agents, etc., may also be added.

The polyisocyanates which may be used according to the present invention include aliphatic, cycloaliphatic, araliphatic, aromatic and heterocyclic polyisocyanates of the type which have been described, for example, by W. Siefken in Justus Liebigs Annalen der Chemie, 562, pages 75 to 136, for example, ethylene diisocyanate, tetramethylene-1,4-diisocyanate, hexamethylene-1,6-diisocyanate, dodecane-1,12-diisocyanate, cyclobutane-1,3-diisocyanate cyclohexane-1,3- and -1,4-diisocyanate and mixtures of these isomers, 1-isocyanato-3,3,5-trimethyl-5-isocyanato-methylcyclohexane (German Auslegeschrift No. 1,202,785, U.S. Pat. No. 3,401,190), hexahydrotolylene-2,4- and -2,6-diisocyanate and mixtures of these isomers, hexahydrophenylene-1,3- and/or 1,4-diisocyanate, perhydrodiphenylmethane-2,4'- and/or 4,4'-diisocyanate, phenylene-1,3- and -1,4-diisocyanate, tolylene-2,4- and -2,6-diisocyanate and mixtures of these isomers, diphenylmethane-2,4'- and/or 4,4'-diisocyanate, naphthylene-1,5-diisocyanate, triphenyl methane-4,4',4''-triisocyanate, polyphenyl-polymethylenepolyisocyanates which may be obtained by anilineformaldehyde condensation followed by phosgenation and which have been described, for example, in British Pat. Nos. 874,430 and 848,671, m- and p-isocyanatophenylsulphonylisocyanates according to U.S. Pat. No. 3,454,606, perchlorinated aryl polyisocyanates of the type described, for example, in German Auslegeschrift No. 1,157,601 (U.S. Pat. No. 3,277,138), polyisocyanates containing carbodiimide groups as described in German Pat. No. 1,092,007 (U.S. Pat. No. 3,152,162), the diisocyanates described in U.S. Pat. No. 3,492,330, polyisocyanates containing allophanate groups as described, for example, in British Pat. No. 994,890, Belgian Pat. No. 761,626 and published Dutch Patent Application No. 7,102,524, polyisocyanates containing isocyanurate groups as described, for example, in U.S. Pat. No. 3,001,973, in German Pat. Nos. 1,022,789; 1,222,067 and 1,027,394 and in German Offenlegungsschrift Nos. 1,929,034 and 2,004,048, polyisocyanates containing urethane groups as described, for example, in Belgian Pat. No. 752,261 or in U.S. Pat. No. 3,394,164, polyisocyanates containing acylated urea groups according to German Pat. No. 1,230,778, polyisocyanates containing biuret groups as described, for example, in German Pat. No. 1,101,394 (U.S. Pat. Nos. 3,124,605 and 3,201,372) and in British Pat. No. 889,050, polyisocyanates prepared by telomerization reactions as described, for example, in U.S. Pat. No. 3,654,106, polyisocyanates containing ester groups, such as those mentioned, for example, in British Pat. Nos. 965,474 and 1,072,956, in U.S. Pat. No. 3,567,763 and in German Pat. No. 1,231,688, reaction products of the above-mentioned isocyanates with acetals according to German Pat. No. 1,076,385 and polyisocyanates containing polymeric fatty acid groups according to U.S. Pat. No. 3,455,883.

The distillation residues which still contain isocyanate groups from the commercial production of isocyanates may also be used, if desired as solutions in one or more of the above-mentioned polyisocyanates. Mixtures of the above-mentioned polyisocyanates may also be used.

It is generally most preferred to use commercially readily available polyisocyanates, such as tolylene-2,4- and -2,6-diisocyanate or mixtures of these isomers ("TDI"), polyphenyl-polymethylene-polyisocyanates which may be obtained by aniline-formaldehyde condensation followed by phosgenation ("crude MDI") and polyisocyanates containing carbodiimide groups, urethane groups, allophanate groups, isocyanurate groups, urea groups or biuret groups ("modified polyisocyanates").

In cases where it is important for the polyurethanes to have high resistance to light and good solubility properties, on the other hand, (cyclo)aliphatic polyisocyanates are mainly used, preferably hexamethylenediisocyanate and 1-isocyanato-3,3,5-trimethyl-5-isocyanatomethyl-cyclohexane.

Other starting components which may optionally be used according to the present invention, in addition to the dihydroxypolycarbonates, include compounds which generally have a molecular weight of from 400 to 10,000 which contain at least two hydrogen atoms capable of reacting with isocyanates. These include not only compounds containing amino groups, thio groups or carboxyl groups, but particularly also polyhydroxyl compounds, in particular compounds containing from 2 to 8 hydroxy groups, especially those having a molecular weight of from 800 to 10,000 and preferably from 1000 to 6000, e.g. polyesters, polyethers, polythioethers, polyacetals or polyesteramides containing at least two and generally from 2 to 8, but preferably from 2 to 4 hydroxyl groups, of the type which are known for the production of both homogeneous and cellular polyurethanes.

The hydroxyl polyesters which may be used include, e.g. reaction products of polyhydric alcohols, preferably dihydric alcohols, with the optional addition of trihydric alcohols, and polybasic, preferably dibasic, carboxylic acids. Instead of free polycarboxylic acids, the corresponding polycarboxylic acid anhydrides or esters of lower alcohols or mixtures thereof may be used for preparing the polyesters. The polycarboxylic acid may be aliphatic, cycloaliphatic, aromatic and/or heterocyclic and may be substituted, e.g. by halogen atoms, and/or be unsaturated. The following are given as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and bis-glycol terephthalate. The following are examples of suitable polyhydric alcohols: ethylene glycol, propylene-1,2- and -1,3-glycol, butylene-1,4- and -2,3-glycol, hexane-1,6-diol, octane-1,8-diol, neopentyl glycol, cyclohexane dimethanol (1,4-bis-hydroxymethylcyclohexane), 2-methylpropanediol-(1,3), glycerol trimethylolpropane, hexane-1,2,6-triol, butane-1,2,4-triol, trimethylolethane, pentaerythritol, quinitol, mannitol and sorbitol and methyl glycoside; also diethylene glycol, triethylene glycol, tetraethylene glycol, polyethylene glycols, dipropylene glycol, polypropylene glycols, dibutylene glycol and polybutylene glycols. The polyesters may also contain carboxyl end groups. Polyesters of lactones, such as ε-caprolactone, or hydroxycarboxylic acids, such as ω-hydroxycaproic acid, may also be used.

The polyethers which may be used according to the present invention and which contain at least two, generally from 2 to 8, preferably 2 or 3 hydroxyl groups are also of known type and may be obtained, for example, by the polymerization of epoxides, such as ethylene oxide, propylene oxide, butylene oxide, tetrahydrofuran, styrene oxide or epichlorohydric, each on its own, for example, in the presence of BF$_3$, or by addition of these epoxides, optionally as mixtures or successively to starting components containing reactive hydrogen atoms, such as alcohols or amines, e.g. water, ethylene glycol, propylene-1,3- or -1,2-glycol, trimethylolpropane, 4,4'-dihydroxydiphenylpropane, aniline, ammonia, ethanolamine, or ethylene diamine. Sucrose polyethers, such as those described, for example, in German Auslegeschrift Nos. 1,176,358 and 1,064,938 may also be used according to the present invention. It is frequently preferred to use those polyethers which contain predominantly primary OH groups (up to 90%, by weight, based on all the OH groups in the polyether). Polyethers which have been modified by vinyl polymers, for example, the products obtained by the polymerization of styrene or acrylonitrile, in the presence of polyethers (U.S. Pat. Nos. 3,383,351; 3,304,273; 3,523,093; and 3,110,695 and German Pat. No. 1,152,536) and polybutadienes which contain OH groups are also suitable.

Among the polythioethers there should be particularly mentioned the condensation products obtained by the reaction of thiodiglycol on its own and/or with other glycols, dicarboxylic acids, formaldehyde, aminocarboxylic acids or amino alcohols. The products obtained are polythio mixed ethers, polythioether esters or polythioether ester amides, depending on the cocomponent.

Suitable polyacetals, are, for example, the compounds which may be prepared from glycols, such as diethylene glycol, triethylene glycol, 4,4'-dioxethoxydiphenyldimethylmethane and hexanediol, with formaldehyde. Polyacetals suitable for the purpose according to the present invention may also be prepared by the polymerization of cyclic acetals.

Suitable polyester amides and polyamides include, for example, the predominantly linear condensates obtained from the polybasic saturated and unsaturated carboxylic acids or the anhydrides thereof and polyvalent saturated and unsaturated amino alcohols, diamines, polyamines or mixtures thereof.

Representatives of these compounds which may be used according to the present invention have been described, for example, in High Polymers, Vol. XVI, "Polyurethanes, Chemistry and Technology" by Saunders-Frisch, Interscience Publishers, New York, London, Volume 1, 1962, pages 32 to 42 and pages 44 to 55 and Volume II, 1964, pages 5 to 6 and 198 to 199 and in Kunststoff-Handbuch, Volume VII, Vieweg-Höchtlen, Carl-Hanser-Verlag, Munich, 1966, e.g. on pages 45 to 71.

The starting components used according to the present invention may also include compounds having a molecular weight of from 32 to 400 which contain at least two hydrogen atoms capable of reacting with isocyanates. These are also compounds containing hydroxyl groups and/or amino groups and/or thiol groups and/or carboxyl groups, preferably hydroxyl groups and/or amino groups, and they serve as chain lengthening agents or cross-linking agents. They generally contain from 2 to 8, preferably 2 or 3 hydrogen atoms which are reactive with isocyanates. The following are examples of such compounds: ethylene glycol, propylene-1,2- and -1,3-glycol, butylene-1,4- and -2,3-glycol, pentane-1,5-diol, hexane-1,6-diol, octane-1,8-diol, neopentyl glycol, 1,4-bis-hydroxymethylcyclohexane, 2-methyl-propanediol-(1,3), glycerol trimethylolpropane, hexane-1,2,6-triol, trimethylolethane, pentaerythritol, quinitol, mannitol and sorbitol, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight up to 400, 4,4'-dihydroxydiphenylpropane, dihydroxymethylhydroquinone, ethanolamine, diethanolamine, triethanolamine, 3-aminopropanol, ethylene diamine, 1,3-diaminopropane, 1-mercapto-3-aminopropane, 4-hydroxyphthalic acid or 4-aminophthalic acid, succinic acid, adipic acid, hydrazine, N,N'-dimethylhydrazine and 4,4'-diaminodiphenylmethane.

Also in this case mixtures of various compounds having a molecular weight of from 32 to 400 and containing at least two hydrogen atoms which are reactive with isocyanates may be used.

The following Examples illustrate the invention.

(The figures given represent parts by weight or percentages by weight unless otherwise indicated).

EXAMPLES

EXAMPLE 1

A mixture of 236 g (2 mols) of hexane-1,6-diol, 212 g (2.4 mols) of glycol carbonate, 300 ml of cumene and 300 ml of diisopropylbenzene is heated under reflux in a flask equipped with stirrer, to which is attached a packed column 70 cm in length and 3 cm in diameter with a phase separator at the top. 0.3 g of dibutyl tin dilaurate is added as transesterification catalyst. The sump temperature is 175° C. 108 ml (= 120 g) of glycol ($n_D^{23}$ = 1.4310) have been removed from the reaction mixture after 25 hours. The column is removed and the solvent and excess glycol carbonate (31 g) are distilled off at reduced pressure until a temperature of 220° C is reached at 10 Torr. A waxy product which solidifies as crystals with a yellow tint is obtained. Yield: 282 g = 99% of the theoretical yield, OH number: 55 to 56.

Comparison Experiment 1a

This experiment demonstrates the effect of an experimental arrangement without carrier.

Using the same apparatus as described above, 2 mols of hexane-1,6-diol, 2.4 mols of glycol carbonate and 0.3 g of dibutyl tin dilaurate are reacted at 175° C and under a pressure of from 100 to 80 Torr so that the distillate passes over at from 135° to 140° C. The reaction temperature is gradually raised to 230° C in the course of 10 hours while the pressure is reduced stepwise to 18 Torr. This is necessary because otherwise it is not possible to remove the glycol completely from the polycondensate. The distillate (172 g) which partly solidifies contains a considerable quantity of glycol carbonate in addition to glycol. The glycol carbonate distills off with the glycol as an azeotropic mixture. The remainder of volatile constituents (16 g) is distilled off at temperatures up to 220° C/10 Torr. The residue obtained is a soft resin which only slowly crystallizes. Yield: 241 g = 83.5% of the theoretical yield, OH number: 122.

Comparison Experiment 1b

This experiment demonstrates the effect of an experimental arrangement without fractionating column.

A mixture of 2 mol of hexane-1,6-diol, 2.4 mols of glycol carbonate, 300 ml of cumene, 300 ml of diisopropylbenzene and 0.3 g of dibutyl tin dilaurate is reacted as in Example 1 in a flask equipped with stirrer with phase separator attached. 160 ml of liquid have been removed after 7 hours. The solvent and unreacted glycol carbonate are distilled off at reduced pressure up to a temperature of 220° C under a pressure of 8 Torr. The residue has a soft, suety consistency. Yield: 195 g = 68% of the theoretical yield, OH number 135.

Comparison Experiment 1c

This experiment demonstrates the effect of using an unsuitable carrier.

2 mols of hexane-1,6-diol, 2.4 mols of glycol carbonate, 200 ml of mineral spirits with a boiling range of from 160° to 190° C and 0.3 g of dibutyl tin dilaurate are reacted together in the same apparatus as described in Example 1 at a sump temperature of from 175° to 180° C. 125 ml of liquid are removed in the course of 19 hours. After removal of solvent and volatile constituents by distillation at temperatures of up to 220° C/10 Torr, a soft suety residue is left. Yield: 251 g = 87% of the theoretic yield, OH number 110.

EXAMPLE 2

Using the same apparatus as described in Example 1, 2 mols of hexane-1,6-diol, 2.2 mols of glycol carbonate, 0.5 g of tetrabutyl titanate and 200 ml of cumene are reacted together at a sump temperature of from 164° to 168° C and a head temperature of from 149° to 151° C. 121 g of glycol ($n_D^{23}$ = 1.4308) have been removed after 21 hours. A pale yellow, hard waxy, crystalline residue is obtained after removal of the solvent and excess glycol carbonate by distillation at temperatures of up to 200° C/10 Torr. Yield: 287 g = 100% of theoretical yield, OH number 51 to 52.

EXAMPLE 3

118 g (1 mol) of hexane-1,6-diol, 97 g (1.1 mol) of glycol carbonate, 0.2 g of sodium acetate and 200 ml of xylene are reacted in the same apparatus as described in Example 1 at a sump temperature of from 140° to 143° C. 60 g of glycol have been removed after 24 hours. A yellowish, wax-like crystalline residue is left after removal of the solvent and excess glycol carbonate by distillation at temperatures of up to 200° C/15 Torr. Yield: 142 g = 99% of the theoretical yield, OH number 66 to 68.

EXAMPLE 4

Example 3 is repeated, using 1.5 g of dibutyl tin dilaurate as catalyst. Elimination of glycol (60.5 g) is completed after 25 hours. The residue is similar to that obtained in Example 3. Yield: 141 g = 98% of the theoretical yield, OH number 71 to 72.

EXAMPLE 5

Example 3 is repeated, using 0.06 g of lithium hydroxide as catalyst. Elimination of glycol is completed after 23 hours. The residue is a colorless, crystalline wax. Yield: 135 g = 94% of the theoretical yield, OH number 77 to 78.

EXAMPLE 6

Using the same apparatus as described in Example 1, 2 mols of hexane-1,6-diol, 2.2 mols of glycol carbonate, 200 ml of cumene and 10 g of tin powder are reacted at a sump temperature of from 166° to 169° C and a head temperature of from 150° to 151° C until, after 30 hours, 116 g of glycol ($n_D^{23}$ = 1.4308) have been removed. The catalyst is removed by suction filtration and the filtrate is worked-up by distillation at temperatures of up to 200° C/12 Torr. The residue is a completely colorless, crystalline wax. Yield: 286 g = 99% of the theoretical yield, OH number 64.

EXAMPLE 7

Using an apparatus which is similar to that described in Example 1, but with a column 1 m in length, 212 g (2 mols) of dimethylene glycol, 229 g (2.6 mols) of glycol carbonate, 150 ml of cumene and 0.5 g of tetrabutyl titanate are reacted together at a sump temperature of from 165° to 170° C and a head temperature of from 150° to 151° C until, after 59 hours, 118 g of glycol have been removed. After separation of the solvent and excess glycol carbonate by distillation at reduced pressure up to a temperature of 200° C at 7 Torr, a yellowish, thick liquid is obtained as residue. Yield: 242 g = 99% of the theoretical yield, OH number 91 to 92.

The same result is obtained when 150 ml of anisole are used as carrier.

EXAMPLE 8

Using the same apparatus as described in Example 1, 300 g (2 mols) of triethylene glycol, 212 g (2.4 mols) of glycol carbonate, 200 ml of cumene and 0.5 g of tetrabutyl titanate are reacted together at a sump temperature of from 164° to 167° C and a head temperature of from 150° to 151° C. 105 g of glycol have been split off after 72 hours. The solvent and excess glycol carbonate are removed by distillation up to a temperature of 200° C at 8 Torr and a yellowish, thick oil is obtained as residue. Yield: 344 g = 98% of the theoretical yield, OH number 95.

EXAMPLE 9

Using the same apparatus as described in Example 1, 144 g (1 mol) of 1,4-dimethylolcyclohexane, 97 g (1.1 mol) of glycol carbonate, 0.2 g of tetrabutyl titanate and 200 ml of xylene are reacted together until, after 23 hours at a sump temperature of from 140° to 143° C, 60 g of glycol have been removed. When the reaction product has been worked-up by distillation at reduced pressure up to a temperature of 200° C at 10 Torr, a yellowish, crystalline residue is obtained. Yield: 168 = 100% of the theoretical yield, OH number 78 to 79.

EXAMPLE 10

Example 9 is repeated, but using 0.2 g of sodium acetate as catalyst. 63 g of glycol have been separated in the separator after 16 hours at a sump temperature of from 147° to 148° C. The almost colorless residue is a brittle, crystalline hard resin. Yield: 169 g = 100% of the theoretical yield, OH number 67 to 68.

EXAMPLE 11

Using the same apparatus as described in Example 1, 316 g (1 mol) of 2,2-bis-(p-hydroxyethoxyphenyl)-propane (bisoxethyl bisphenol A), 106 g (1.2 mol) of glycol carbonate, 0.2 g of boron trioxide, 0.2 g of zinc oxide and 200 ml of mesitylene are reacted together at a sump temperature of from 168° to 172° C and a head temperature of from 156° to 158° C until, after 17 hours, 61 g of glycol have been removed. The solvent and glycol carbonate are removed at reduced pressure up to a temperature of 200° C/10 Torr. The residue is an almost colorless, tough, elastic hard resin. Yield: 341 g = 100% of the theoretical yield, OH number 83.

EXAMPLE 12

Using the same apparatus as described in Example 1, 240 g (1 mol) of 2,2-bis-(4-hydroxycyclohexyl)-propane (perhydrobisphenol A), 97 g (1.1 mol) of glycol carbonate, 0.25 g of tetrabutyltitanate and 200 ml of cumene are reacted together at a sump temperature of 173° C and a head temperature of from 149° to 151° C. 55 g of glycol have been removed after 22 hours. The solvent and unreacted glycol carbonate are removed by distillation at reduced pressure up to a temperature of 200° C at 10 Torr. The residue is a yellowish, brittle hard resin. Yield: 267 g = 100% of the theoretical yield, OH number 49 to 51.

EXAMPLE 13

180 g (2 mols) of butane-1,4-diol, 176 g (2 mols) of glycol carbonate, 0.5 g of tetrabutyl titanate and 300 ml of o-xylene are reacted at a reaction temperature of from 150° to 152° C in the same apparatus as described in Example 7. 106 ml of glycol have been removed after 25 hours. The filtrate is worked-up by distillation at temperatures of up to 200° C/10 Torr. The residue is a yellowish, hard crystalline wax. Yield: 195 g = 84% of the theoretical yield, OH number 78.

EXAMPLE 14

236 g (2 mols) of hexane-1,6-diol, 176 g (2 mols) of glycol carbonate, 0.5 g of N-methyl-dicyclohexylamine, 200 ml of α-methylstyrene and 0.1 g of hydroquinone are reacted in an apparatus similar to that described in Example 1, but with a 60 cm fractionating column, at a reaction temperature of from 183° to 186° C and a head temperature of 162° C. 112 g of glycol ($n_D^{23}$ = 1.4320) have been removed after 19 hours. α-methylstyrene is removed by distillation at reduced pressure up to 200° C/9 Torr. The residue is a colorless, wax-like crystalline product. Yield: 284 g = 99% of the theoretical yield, OH number 59 to 61.

EXAMPLE 15

A mixture of 236 g (2 mol) hexane-1,6-diol, 194 g (2.2 mol) glycol carbonate and 400 g cumene is heated to 155° C while being stirred in a 1 liter stirrer-equipped flask, which flask is equipped with a packed column 60 cm in length and approximately 2.5 cm in diameter, which column is provided at its head with a phase separator. Ethylene glycol is distilled off azeotropically. In the course of the reaction, the sump temperature rises as a result of the removal of distilled cumene, until it finally reaches 169° C. After 58 hours, 124 g of glycol have been separated, i.e. 100% of the theoretical yield. Then, under reduced pressure cumene and excess glycol carbonate are distilled off finally at a sump temperature of from 190° to 200° C at a pressure of from 10 to 2 Torr. 288 g (100% of the theoretical yield) of a colorless, wax-like polycarbonate solidifying in crystalline form, having an OH number of from 65 to 67 is obtained as a residue.

EXAMPLE 16

Example 15 is repeated, but instead of 194 g (2.2 mols), 264 g (3.0 mol) glycol carbonate are used. After 48 hours, 127 g of glycol are separated. After working-up, 288 g (100% of the theoretical yield) of colorless polycarbonate remain.

EXAMPLE 17

In a manner similar to Example 15, instead of hexane-1,6-diol, 284 g (2 mol) 1,4-dimethylolcyclohexane is reacted. After 126 g of glycol has been separated, the product is worked-up. 332 g (99% of the theoretical yield) of a colorless, crystalline, hard wax-like polycarbonate is obtained having an OH-number of from 59 to 61.

EXAMPLE 18

In a flask equipped with a stirrer and a packed column 1m in length and 4.5 cm in diameter, at the head of which column there is a phase separator, a mixture of 786 g (6.66 mol) hexane-1,6-diol, 300 g (0.33 mol) butane-1,4-diol, 880 g (10 mol) glycol carbonate and 1.2 liters cumene are heated to reflux. The sump temperature is from 158° to 159° C. After 65 hours, 530 ml (= 600 g) glycol are separated. By distilling off 433 g cumene, the sump temperatures is brought to 169° C and after a further 8 hours heating under reflux the total quantity of 537 ml (= 607 g glycol) is separated. The column is removed and the solvent and unreacted starting material are distilled off at reduced pressure, ultimately 200° C/0.06 Torr. In this way 1134 g of a light-colored, viscous product are obtained.

Yield: 84% of the theoretical yield. OH-number: from 48 to 49.

EXAMPLE 19

In the same apparatus and in the same manner as in Example 15, a mixture of 1180 g (10 mol) hexane-1,6-diol, 968 g (11 mol) glycol carbonate and 1.5 liters cumene are reacted at a temperature of 160° C in the course of 65 hours and 527 ml (= 595 g) glycol are separated. Solvent and volatile components are removed at reduced pressure, ultimately 200° C/0.08 Torr. The residue is a colorless hard wax solidifying in crystalline form at room temperature. Yield: 1462 g = 100% of the theoretical yield; OH-number: from 54 to 55.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A transesterification process for the preparation of polycarbonates containing aliphatically bound hydroxyl end groups comprising:
   (a) reacting
       (i) aliphatic dihydroxyl compounds with
       (ii) glycol carbonate, in the presence of
       (iii) inert solvents selected from the group of compounds consisting of toluene, xylene, ethylbenzene, cumene, 1,2,4-trimethylbenzene, mesitylene, tetramethylbenzene, cymene, diethylbenzene, diisopropylbenzene, chlorotoluene, bromobenzene, tetralin, propenylbenzene, allylbenzene, α-methylstyrene, dibutylether, diisobutylether, diamylether, anisole, phenetole, cresol methyl ether, dibutyl ketone, di-tert.-butyl ketone and diamyl ketone, in which ethylene glycol is substantially immiscible, said inert solvents being capable of forming azeotropes with the ethylene glycol to permit selective azeotropic separation of said ethylene glycol; and
   (b) simultaneously separating the ethylene glycol by fractional distillation.

2. A process according to claim 1 conducted in the absence of transesterification catalysts.

3. A process according to claim 1 conducted in the presence of transesterification catalysts.

4. A process according to claim 3 wherein the transesterification catalysts are present in from about 0.0001 to 0.5% by weight based on the weight of the reaction mixture.

5. A process according to claim 1 wherein the substances used as inert solvents and formers of azeotropic mixtures are subsequently circulated over a substance which absorbs ethylene glycol.

6. In a process for the preparation of polyurethanes from hydroxyl-bearing compounds, the improvement comprising reacting the polycarbonates prepared according to the process of claim 1 with a polyisocyanate.

7. In a process for the preparation of polycarbonates containing aliphatically bound hydroxyl end groups comprising transesterification of aliphatic dihydroxyl compounds with glycol carbonate with simultaneous separation of ethylene glycol by fractional distillation, the improvement comprising removing ethylene glycol from the reaction mixture as an azeotropic mixture with inert solvents selected from the group of compounds consisting of toluene, xylene, ethylbenzene, cumene, 1,2,4-trimethylbenzene, mesitylene, tetramethylbenzene, cymene, diethylbenzene, diisopropylbenzene, chlorotoluene, bromobenzene, tetralin, propenylbenzene, allylbenzene, α-methylstyrene, dibutylether, diisobutylether, diamylether, anisole, phenetole, cresol methyl ether, dibutyl ketone, di-tert.-butyl ketone and diamyl ketone, in which ethylene glycol is substantially immiscible, said inert solvents being capable of forming azeotropes with ethylene glycol to permit selective azeotropic separation of said ethylene glycol.

8. A process according to claim 7 conducted in the absence of transesterification catalysts.

9. A process according to claim 7 conducted in the presence of transesterification catalysts.

10. A process according to claim 9 wherein the transesterification catalysts are present in from about 0.0001 to 0.5% by weight based on the weight of the reaction mixture.

11. A process according to claim 7 wherein the substances used as inert solvents and formers of azeotropic mixtures are subsequently circulated over a substance which absorbs ethylene glycol.

12. In a process for the preparation of polyurethanes from hydroxyl-bearing compounds, the improvement comprising reacting the polycarbonates prepared according to the process of claim 7 with a polyisocyanate.

13. A transesterification process for the preparation of polycarbonates containing aliphatically bound hydroxyl end groups comprising:
   (a) reacting
       (i) aliphatic dihydroxyl compounds with
       (ii) glycol carbonate, in the presence of
       (iii) inert solvents selected from the group of ketones consisting of dibutyl ketone, di-tert.-butyl ketone and diamyl ketone in which ethylene glycol is substantially immiscible, said inert solvents being capable of forming azeotropes with the ethylene glycol to permit selective azeotropic separation of said ethylene glycol; and
   (b) simultaneously separating the ethylene glycol by fractional distillation.

14. In a process for the preparation of polycarbonates containing aliphatically bound hydroxyl end groups comprising transesterification of aliphatic dihydroxyl compounds with glycol carbonate with simultaneous separation of ethylene glycol by fractional distillation, the improvement comprising removing ethylene glycol from the reaction mixture as an azeotropic mixture with inert solvents selected from the group of ketones consisting of dibutyl ketone, di-tert.-butyl ketone and diamyl ketone in which ethylene glycol is substantially immiscible, said inert solvents being capable of forming azeotropes with ethylene glycol to permit selective azeotropic separation of said ethylene glycol.

* * * * *